(12) United States Patent
Kim et al.

(10) Patent No.: US 8,508,824 B2
(45) Date of Patent: Aug. 13, 2013

(54) SCANNING LENS APPARATUS ADOPTING BIMORPH ACTUATOR

(75) Inventors: Woon-bae Kim, Seoul (KR); Eun-sung Lee, Hwaseong-si (KR); Kyu-dong Jung, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 92 days.

(21) Appl. No.: 13/189,641

(22) Filed: Jul. 25, 2011

(65) Prior Publication Data

US 2012/0170094 A1 Jul. 5, 2012

(30) Foreign Application Priority Data

Dec. 31, 2010 (KR) .................. 10-2010-0140550

(51) Int. Cl.
*G02B 26/08* (2006.01)
(52) U.S. Cl.
USPC ........................................... 359/200.8
(58) Field of Classification Search
USPC ............. 359/200.8, 223.1–226.1, 290, 291
See application file for complete search history.

(56) References Cited

U.S. PATENT DOCUMENTS

| 6,134,003 | A | 10/2000 | Tearnery et al. |
|---|---|---|---|
| 6,485,413 | B1 | 11/2002 | Boppart et al. |
| 6,608,684 | B1 | 8/2003 | Gelikonov et al. |
| 7,223,232 | B2 | 5/2007 | Mizuno |
| 7,616,986 | B2 | 11/2009 | Seibel et al. |
| 7,772,569 | B2 | 8/2010 | Bewersdorf et al. |
| 2004/0181148 | A1* | 9/2004 | Uchiyama et al. ........... 600/425 |
| 2005/0052753 | A1 | 3/2005 | Kanai |
| 2006/0184042 | A1 | 8/2006 | Wang et al. |
| 2006/0241503 | A1 | 10/2006 | Schmitt et al. |
| 2008/0228086 | A1 | 9/2008 | Ilegbusi et al. |
| 2009/0225324 | A1 | 9/2009 | Bernstein et al. |

FOREIGN PATENT DOCUMENTS

| JP | 2001-255265 A | 9/2001 |
|---|---|---|
| JP | 2002-202253 A | 7/2002 |
| JP | 2006-170687 A | 6/2006 |
| KR | 10-2008-0067100 A | 7/2008 |

\* cited by examiner

*Primary Examiner* — Euncha Cherry
(74) *Attorney, Agent, or Firm* — Sughrue Mion, PLLC

(57) ABSTRACT

A scanning lens apparatus with a bimorph actuator is provided. The scanning lens apparatus includes: a housing having a hollow cylindrical shape; a first suspension and a second suspension which are parallel to each other, and a first end of each of the first suspension and the second suspension is fixed on an inner surface of the housing; first bimorphs disposed on first surfaces of the first and second suspensions and second bimorphs disposed on second surfaces facing the first surfaces of the first and second suspensions; a first lens which is fixed between a second end of the first suspension and a second end of the second suspension; a second lens fixed parallel to the first lens between the first and second suspensions; and an object lens disposed on an end of the housing to face the second lens with respect to the first lens.

24 Claims, 6 Drawing Sheets

SCANNING LENS APPARATUS ADOPTING BIMORPH ACTUATOR

CROSS-REFERENCE TO RELATED APPLICATIONS

This application claims priority from Korean Patent Application No. 10-2010-0140550, filed on Dec. 31, 2010, in the Korean Intellectual Property Office, the disclosure of which is incorporated herein in its entirety by reference.

BACKGROUND

1. Field

Apparatuses consistent with exemplary embodiments relate to scanning lens apparatuses adopting bimorph actuators.

2. Description of the Related Art

Techniques for precisely scanning images of skin surfaces and tissues under the skin of the human body are in increasing demand in the medical imaging field. In particular, since most cancers occur under epithelial cells and then spread into dermal cells where blood vessels are present, early detection of cancers through biopsy of the epithelial cells is important. The internal tomography may be acquired through the skin by using a conventional magnetic resonance imaging (MRI) technique, a computerized tomography (CT) imaging technique, or an ultrasonic imaging technique. However, early detection of cancer, which is small in size is difficult due to the low resolution of a tomogram obtained by the conventional imaging techniques.

However, a recent optical coherence tomography (OCT) technique is capable of detecting cancer with a size of 50~100 μm earlier. This is because the OCT technique has a resolution approximately ten times greater than that of the ultrasonic imaging technique even though its penetration into the skin is as low as 2~3 mm. However, because the OCT technique has a lower resolution level than that of a microscope, the OCT technique cannot replace a biopsy and histology used for differentiating an actual cancer. For early differentiation of a cancer, an area scanning apparatus such as a lateral scanning apparatus, besides a depth scanning apparatus, is needed.

A confocal microscopy allows a cancer diagnosis of an internal tissue through a high resolution surface imaging method without performing a biopsy. However, the confocal microscopy requires a high numerical aperture (NA) optical system for high resolution in a horizontal direction and actuators for lateral scanning and area scanning.

A conventional actuator includes a pneumatic actuator, a rotating prism, a galvano mirror, and an electrostatic micro-electrical-mechanical-system (MEMS) scanner. However, miniaturization and increasing the speed of these devices are difficult.

An actuator that uses a bimorph can move an end of a member on which a bimorph is mounted to a side by applying a voltage. However, the end of the member cannot move in a horizontal direction but moves at a slant with respect to an object. Therefore, a correct image cannot be rapidly scanned.

SUMMARY

Provided are lens scanning apparatuses adopting bimorph actuators that move in a horizontal direction with respect to an object to be scanned.

Additional aspects will be set forth in part in the description which follows and, in part, will be apparent from the description, or may be learned by practice of the exemplary embodiments.

According to an aspect, there is provided a scanning lens apparatus with a bimorph actuator, the scanning lens apparatus including: a housing having a hollow cylindrical shape; a first suspension and a second suspension which are parallel to each other, wherein a first end of each of the first suspension and the second suspension is fixed on an inner surface of the housing; first bimorphs disposed on first surfaces of the first suspension and the second suspension, respectively, and second bimorphs disposed on second surfaces facing the first surfaces with respect to the corresponding first suspension and the corresponding second suspension; a first lens which is fixed between a second end of the first suspension and a second end of the second suspension; a second lens which is fixed parallel to the first lens between the first and second suspensions; and an object lens which is disposed on an end of the housing to face the second lens with respect to the first lens.

The first bimorphs and the second bimorphs may be separated from each other in a length direction of the corresponding suspension.

The first and second bimorphs of the first suspension and the first and second bimorphs on the second suspension may be disposed substantially identical to each other on the corresponding suspension.

Each of the bimorphs may have a structure in which a lower electrode, a bimorph layer, and an upper electrode are sequentially stacked in the stated order on the corresponding surface of the suspension.

The bimorph layers may be formed of a piezoelectric film that expands or contracts according to a polarity of a voltage applied thereto, or may be formed of an electroactive polymer that expands in a length direction of the corresponding suspensions by a voltage applied thereto.

The first and second suspensions respectively may further include bimorphs corresponding to the first bimorphs and the second bimorphs with respect to the corresponding suspensions to respectively face the first bimorphs and the second bimorphs.

The scanning lens apparatus may further include an actuator that moves the housing in a perpendicular direction with respect to an axis that is formed by connecting the first and second suspensions.

According to another aspect, there is provided a scanning lens apparatus adopting a bimorph actuator, the scanning lens apparatus including: a housing having a hollow cylindrical shape; a first suspension and a second suspension which are parallel to each other, wherein a first end of each of the first and second suspensions is fixed on an inner surface of the housing; first bimorphs disposed on first surfaces of the first and second suspensions, respectively, and second bimorphs disposed on second surfaces facing the first surfaces with respect to the corresponding first and second suspensions; a first lens which is fixed between a second end of the first suspension and a second end of the second suspension; a third suspension and a fourth suspension, wherein a first end of each of the third suspension and the fourth suspension is fixed on the inner surface of the housing by forming a second axis with respect to first axis that is formed by connecting the first and second suspensions; third bimorphs disposed on first surfaces of the third and fourth suspensions and fourth bimorphs disposed on second surfaces facing the first surfaces of the corresponding third and fourth suspensions; a second lens which is fixed by second ends of the third and fourth suspensions and is parallel to the first lens; and an object lens disposed on an end of the housing to face the second lens with respect to the first lens.

BRIEF DESCRIPTION OF THE DRAWINGS

These and/or other aspects will become apparent and more readily appreciated from the following description of the exemplary embodiments, taken in conjunction with the accompanying drawings of which.

DETAILED DESCRIPTION

Figure 1:
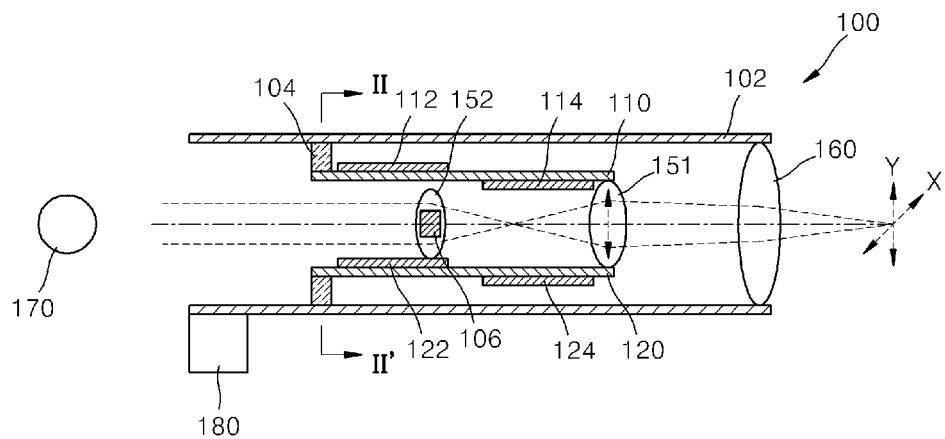
FIG. 1 is a schematic cross-sectional view of the structure of a scanning lens apparatus adopting a bimorph actuator according to an exemplary embodiment.

Reference will now be made in detail to exemplary embodiments, examples of which are illustrated in the accompanying drawings. In the drawings, the thicknesses of layers and regions are exaggerated for clarity and like reference numerals refer to like elements throughout.

Figure 2:
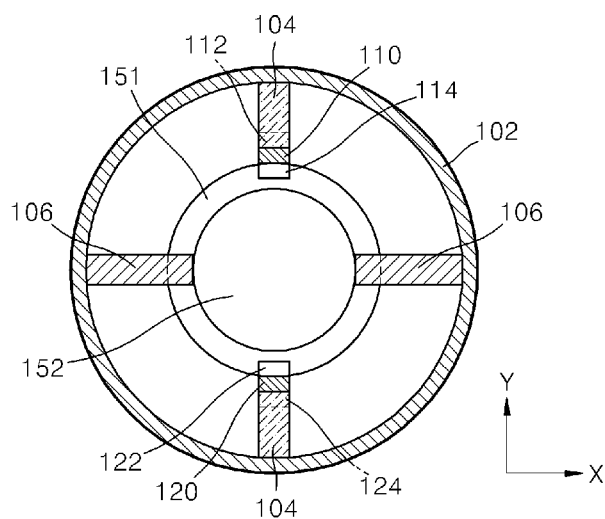
FIG. 2 is a cross-sectional view taken along the line II-II' of FIG. 1.

FIG. 1 is a schematic cross-sectional view of the structure of a scanning lens apparatus 100 adopting a bimorph actuator according to an exemplary embodiment. FIG. 2 is a cross-sectional view taken along the line II-II' of FIG. 1.

Referring to FIGS. 1 and 2, a pair of suspensions, that is, a first suspension 110 and a second suspension 120, is disposed in a housing 102 having a hollow cylindrical shape. The first and second suspensions 110 and 120, respectively, are fixed in parallel to one another on an inner surface of the housing 102, such that an end of each of the first and second suspensions 110 and 120 is fixed by a first fixing member 104. The first fixing members 104 are disposed in a vertical axis direction (Y-direction) on the inner surface of the housing 102. A first lens 151 is fixed on the other ends of the first suspension 110 and the second suspension 120.

The housing 102 may be formed of a metal, such as stainless steel or plastic, that is harmless to the human body. The first and second suspensions 110 and 120 may be formed of a material having an elastic restoring force and having a plate shape. The first lens 151 may be a convex lens.

First bimorphs 112 and 122 are respectively disposed on upper surfaces of the first and second suspensions 110 and 120 in a length direction thereof, and second bimorphs 114 and 124 are respectively disposed on lower surfaces of the first and second suspensions 110 and 120 in the length direction. The first bimorphs 112 and 122 and the second bimorphs 114 and 124 are separated from each other in the length direction.

However, the disposition of the first bimorphs 112 and 122 and the second bimorphs 114 and 124 according to the exemplary embodiment is not limited thereto. For example, the first bimorphs 112 and 122 may be respectively disposed on the lower surfaces of the first and second suspensions 110 and 120 from the edges of the first and second suspensions 110 and 120, and the second bimorphs 114 and 124 may be respectively disposed on the upper surfaces of the first and second suspensions 110 and 120.

The first bimorph 112 and the second bimorph 114 of the first suspension 110 and the first bimorph 122 and the second bimorph 124 of the second suspension 120 may be substantially disposed on the same position with respect to corresponding suspension with the same size.

The first bimorphs 112 and 122 and the second bimorphs 114 and 124 may respectively expand or contract in the length direction of the corresponding first and second suspensions 110 and 120 according to the application of a voltage.

Figure 3:
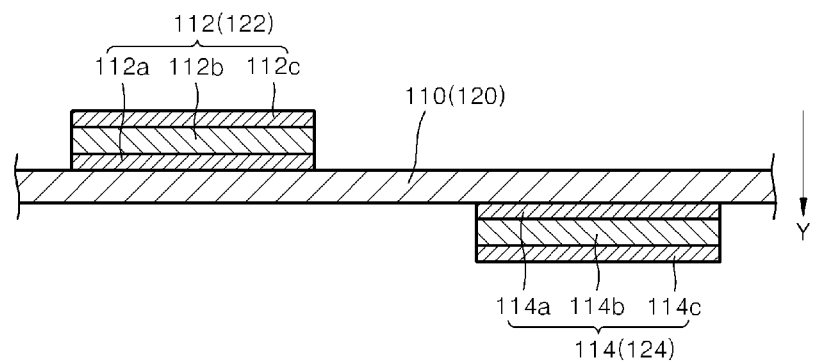
FIG. 3 is a cross-sectional view showing the structure of a first suspension of the scanning lens apparatus adopting a bimorph actuator of FIG. 1, according to an exemplary embodiment.

FIG. 3 is a cross-sectional view showing the structure of the first suspension 110 of FIG. 1.

Referring to FIG. 3, the first bimorph 112 on the upper surface of the first suspension 110 may include a lower electrode 112a, a bimorph layer 112b, and an upper electrode 112c sequentially stacked in the stated order on the upper surface of the first suspension 110. The bimorph layer 112b is formed of a material that expands or contracts in the length direction of the first suspension 110 according to the polarity of a voltage applied between the upper electrode 112c and the lower electrode 112a. For example, the bimorph layer 112b may be a piezoelectric film. If an electric field applied to the piezoelectric film has the same direction as the polarization direction of the piezoelectric film, the piezoelectric film may expand in the length direction, and if the electric field has a direction opposite to the polarization direction thereof, the piezoelectric film may contract in the length direction. The lower electrode 112a and the upper electrode 112c are formed to have flexibility according to the deformation of the bimorph layer 112b. When the lower electrode 112a and the upper electrode 112c are formed of a metal, they may be formed to have a nano-thickness.

Also, the bimorph layer 112b may be formed of an electroactive polymer. The lower electrode 112a and the upper electrode 112c may also be ductile electrodes. Since the electroactive polymer performs only an expansion operation, the scanning lens apparatus 100 that employs the electroactive polymer performs scanning by operating downwards in a Y-axis direction when a voltage is applied to the first bimorph 112 and the second bimorph 114.

The second bimorph 114 also may include a lower electrode 114a, a bimorph layer 114b, and an upper electrode 114c sequentially stacked in the stated order on a lower surface of the first suspension 110. The second bimorph 114 may be practically the same as the first bimorph 112, and thus, a detailed description thereof will not be repeated.

The second suspension 120 has practically the same structure as that of the first suspension 110, and thus, a detailed description thereof will not be repeated.

A second lens 152 is fixed on the inner surface of the housing 102 by a fixing member 106 between the first suspension 110 and the second suspension 120. The second lens 152 may be a convex lens. The second lens 152 is disposed close to an end of the first bimorphs 112 and 122 in a length direction of the housing 102.

An object lens 160 is disposed on an end of the housing 102, and light enters from a light source 170 through an opposite end of the housing 102. The light source 170 may emit visible light or infrared light according to a system adopting the scanning lens apparatus 100.

The scanning lens apparatus 100 may include an actuator 180 that moves the housing 102 in an X-axis direction. The actuator 180 may be a conventional actuator, such as a pneumatic actuator, a rotating prism, a galvano mirror, an electrostatic micro-electrical-mechanical-system (MEMS) scanner, and thus, a detailed description thereof will be omitted.

Figure 4:
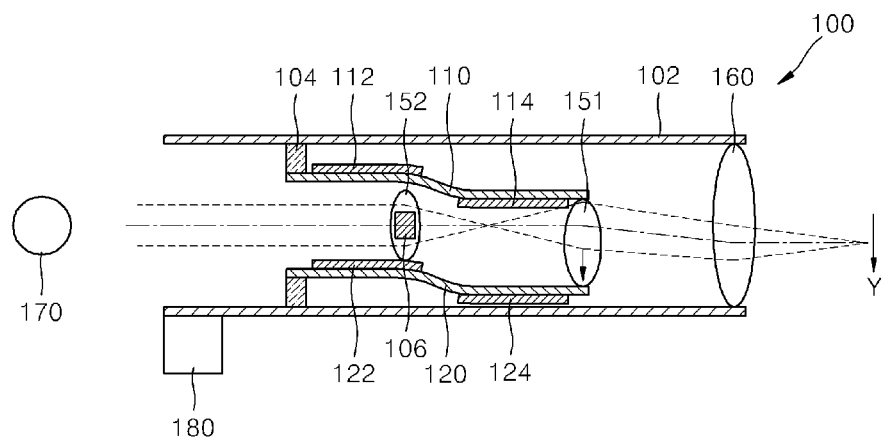
FIGS. 4 and 5 are schematic cross-sectional views for explaining an operation of a scanning lens apparatus adopting a bimorph actuator, according to an exemplary embodiment.
Figure 5:
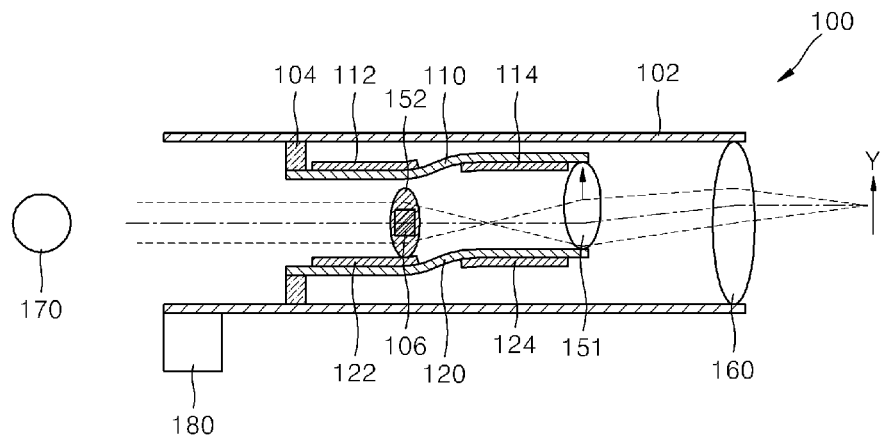

FIGS. 4 and 5 are cross-sectional views for explaining an operation of the scanning lens apparatus 100 according to an exemplary embodiment.

Referring to FIG. 4, when a predetermined voltage is applied to the first bimorphs 112 and 122 and the second bimorphs 114 and 124 of the first and second suspensions 110 and 120 to respectively expand the bimorph layers thereof, ends of the first bimorphs 112 and 122 primarily bend downwards in the Y-axis direction due to the expansion of the bimorph layers (refer to 112b in FIG. 3) of the first bimorphs 112 and 122. Also, ends of the second bimorphs 114 and 124 bend upwards in the Y-axis direction. Accordingly, while the first bimorphs 112 and 122 are moving downwards in the Y-axis direction and the second bimorphs 114 and 124 are moving upwards in the Y-axis direction, light emitted from the light source 170 is compensated to proceed in a horizontal direction. If there are no actions of the second bimorphs 114 and 124, light emitted from the object lens 160 may bend, and as a result, the linearity of the one-dimensional scanning may not be secured.

The magnitude of movement of the first lens 151 may be controlled by controlling the voltage applied to the bimorphs 112, 114, 122, and 124. When a voltage is not applied to the bimorphs 112, 114, 122, and 124, the first lens 151 returns to the original position due to the restoring force of the first suspension 110 and the second suspension 120. The operation described with reference to FIG. 4 may be applied to the cases where the bimorph layers (refer to 112b and 122b in FIG. 3) are formed of a piezoelectric film or an electroactive polymer.

Referring to FIG. 5, when a voltage is applied to the first bimorphs 112 and 122 and the second bimorphs 114 and 124 of the first and second suspensions 110 and 120 to respectively contract the bimorph layers thereof, ends of the first bimorphs 112 and 122 primarily bend upwards in the Y-axis direction due to the contraction of the bimorph layers of the first bimorphs 112 and 122, and ends of the second bimorphs 114 and 124 bend downwards in the Y-axis direction, and thus, light is compensated to proceed in a horizontal direction through the object lens 160. Since the first and second suspensions 110 and 120 move vertically to the object lens 160 due to the action of the second bimorphs 114 and 124, the one-dimensional scanning can be performed perpendicularly to the object lens 160. Accordingly, the one-dimensional scanning can be performed with linearity.

The operation described with reference to FIG. 5 is the case where the bimorph layer 112b is formed of a piezoelectric film.

Also, when the positions of the bimorphs are re-disposed to rotate 180° with respect to the first and second suspensions 110 and 120, the first lens 151 may be moved upwards in the Y-axis direction although the bimorph layers are formed of an electroactive polymer.

A two dimensional scanning can be performed by driving the first lens 151 in the Y-axis direction using the driving method described with reference to FIGS. 4 and 5 while the housing 102 is moved in the X-axis direction by the actuator 180.

Figure 6:
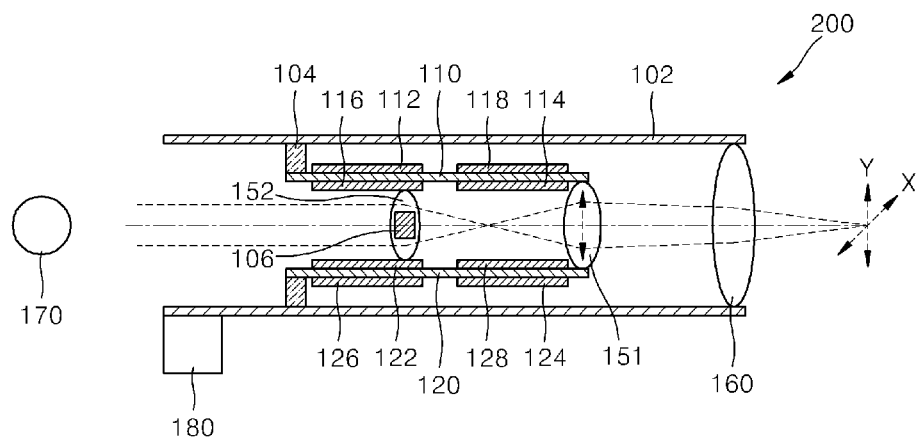
FIG. 6 is a schematic cross-sectional view of a scanning lens apparatus adopting a bimorph actuator, which is a modified version of the scanning lens apparatus adopting a bimorph actuator of FIG. 1, according to an exemplary embodiment.

FIG. 6 is a cross-sectional view of a scanning lens apparatus 200 adopting a bimorph actuator which is a modified version of the scanning lens apparatus 100 of FIG. 1, according to an exemplary embodiment. Like reference numerals are used to indicate elements that are substantially identical to the elements of FIGS. 1 and 2, and thus, the detailed description thereof will not be repeated.

Referring to FIG. 6, bimorphs 116 and 126 are disposed on lower surfaces of the first and second suspensions 110 and 120 to correspond to the first bimorphs 112 and 122 with reference to the corresponding first and second suspensions 110 and 120, and bimorphs 118 and 128 are formed on the upper surfaces of the first and second suspensions 110 and 120 to correspond to the second bimorphs 114 and 124. The bimorphs 116, 118, 126, and 128 have substantially the same structures as the first bimorphs 112 and 122 and the second bimorphs 114 and 124, and thus, the detailed description thereof will not be repeated.

An operation of the scanning lens apparatus 200 will now be described with reference to FIG. 6.

First, a case when the bimorphs 112, 114, 116, 118, 122, 124, 126, and 128 are formed of a piezoelectric film will be described. A predetermined voltage is applied to the first bimorphs 112 and 122 and the second bimorphs 114 and 124 to respectively expand bimorph layers thereof, and another voltage is applied to bimorphs 116, 118, 126, and 128 to contract the bimorph layers thereof. As a result, the driving force of the first and second suspensions 110 and 120 may be increased approximately twice to that of the scanning lens apparatus 100. The first lens 151 moves downwards in the Y-axis direction (refer to FIG. 4).

A predetermined voltage is applied to the first bimorphs 112 and 122 and the second bimorphs 114 and 124 to contract the bimorph layers thereof, and another voltage is applied to the bimorphs 116, 118, 126, and 128 to expand the bimorph layers thereof. As a result, the driving force of the first and second suspensions 110 and 120 may be increased approximately twice to that of the scanning lens apparatus 100. The first lens 151 moves upwards in the Y-axis direction (refer to FIG. 5).

Also, the bimorph layers of the bimorphs 112, 114, 116, 118, 122, 124, 126, and 128 may be formed of an electroactive polymer. The lower electrodes and the upper electrodes 112c and 122c may also be formed of a ductile polymer. Since the electroactive polymer performs only an expansion action, in order to move the scanning lens apparatus 200 adopting an electroactive polymer downwards in the Y-axis direction, a predetermined voltage is applied only to the first bimorphs 112 and 122 and the second bimorphs 114 and 124 and no voltage is applied to the bimorphs 116, 118, 126, and 128. At this point, the driving of the scanning lens apparatus 200 is substantially the same as that of the scanning lens apparatus 100, and thus, the detailed description thereof will not be repeated.

In the case of the scanning lens apparatus 200 adopting an electroactive polymer, in order to move the scanning lens apparatus 200 upwards in the Y-axis direction, a predetermined voltage is applied to the bimorphs 116, 118, 126, and 128, but no voltage is applied to the first bimorphs 112 and 122 and the second bimorphs 114 and 124.

Figure 7:
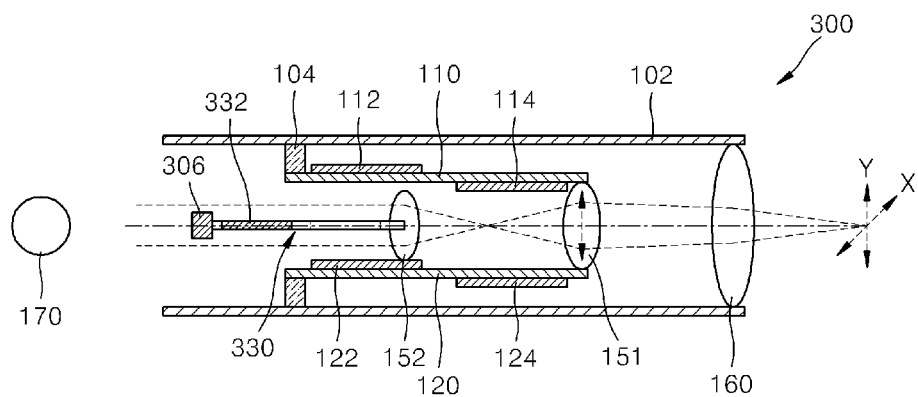
FIG. 7 is a schematic cross-sectional view of the structure of a scanning lens apparatus adopting a bimorph actuator, according to another exemplary embodiment.
Figure 8:
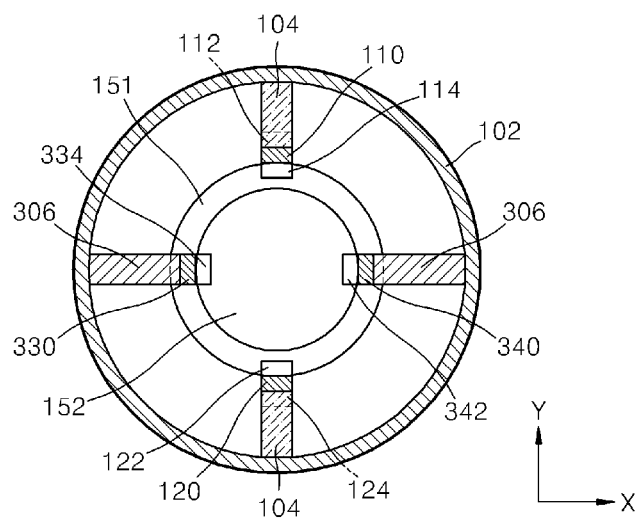
FIG. 8 is a cross-sectional view of the scanning lens apparatus adopting bimorph actuator of FIG. 7.

FIG. 7 is a schematic cross-sectional view of the structure of a scanning lens apparatus 300 adopting a bimorph actuator, according to another exemplary embodiment. FIG. 8 is a cross-sectional view of the scanning lens apparatus 300 of FIG. 7. Like reference numerals are used to indicate elements that are substantially identical to the elements of FIGS. 1 through 5, and thus, the detailed description thereof will not be repeated.

Referring to FIGS. 7 and 8, two pairs of suspensions are disposed in a housing 102 having a hollow cylindrical shape. A pair of the suspensions may include a first suspension 110 and a second suspension 120. Each end of the first and second suspensions 110 and 120 is fixed on an inner surface of the housing 102 by first fixing members 104. The first fixing members 104 are disposed in the Y-axis direction on the inner surface of the housing 102. A first lens 151 is fixed on the other end of each the first and second suspensions 110 and 120.

The housing 102 may be formed of a metal harmless to the human body, such as plastic or stainless steel. The first and second suspensions 110 and 120 may be formed of a material having an elastic restoring force. The first lens 151 may be a convex lens.

First bimorphs 112 and 122 are respectively disposed on upper surfaces of the first and second suspensions 110 and 120 in a length direction thereof, and second bimorphs 114 and 124 are respectively disposed on lower surfaces of the first and second suspensions 110 and 120 in a length direction thereof. The first bimorphs 112 and 122 and the second bimorphs 114 and 124 are disposed separately from each other in a length direction. The first bimorphs 112 and 122 and the second bimorphs 114 and 124 respectively expand or contract in a length direction thereof according to a voltage applied thereto.

The first bimorphs 112 and 122 and the second bimorphs 114 and 124 respectively have structures that are substantially the same as those of the bimorphs of FIG. 3, and thus, the detailed description thereof will not be repeated.

Figure 9:
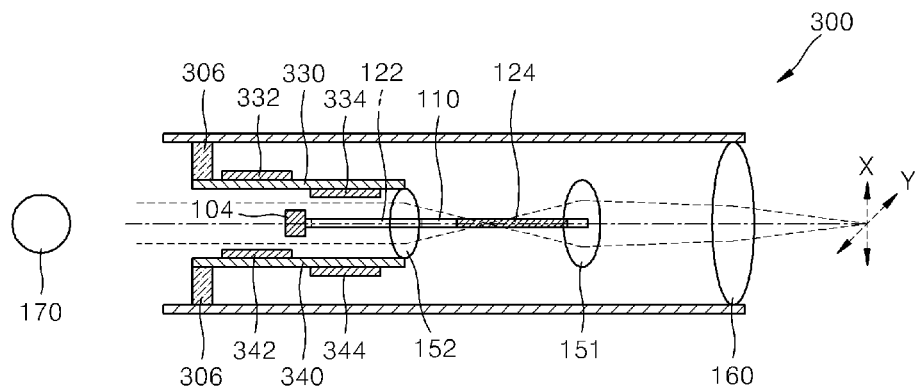
FIG. 9 is a schematic cross-sectional view of the scanning lens apparatus adopting a bimorph actuator of FIG. 7 when the scanning lens apparatus is rotated 90° in a clockwise direction.

FIG. 9 is a cross-sectional view of the scanning lens apparatus 300 of FIG. 7 when the scanning lens apparatus 300 rotates 90° in a clockwise direction.

Referring to FIG. 9, another pair of suspensions may include a third suspension 330 and a fourth suspension 340. Each end of the third and fourth suspensions 330 and 340 is fixed on an inner surface of the housing 102 by second fixing members 306. The second fixing members 306 are disposed in the X-axis direction on the inner surface of the housing 102. A second lens 152 is fixed on the other end of each of the third and fourth suspensions 330 and 340. The second lens 152 may be a convex lens.

An object lens 160 is disposed on an end of the housing, and light enters from a light source 170 through the other end of the housing 102.

Third bimorphs 332 and 342 are respectively disposed on upper surfaces of the third and fourth suspensions 330 and 340 in a length direction thereof, and fourth bimorphs 334 and 344 are respectively disposed on lower surfaces of the third and fourth suspensions 330 and 340 in a length direction thereof. The third bimorphs 332 and 342 and the fourth bimorphs 334 and 344 are disposed separately from each other in a length direction. The third bimorphs 332 and 342 and the fourth bimorphs 334 and 344 respectively expand or contract in the length direction thereof according to a voltage applied thereto.

Figure 10:
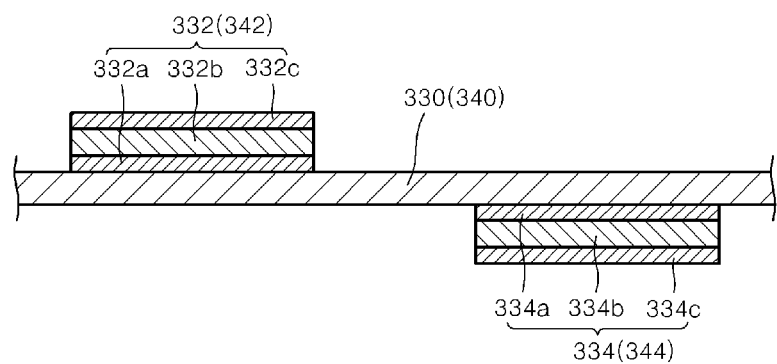
FIG. 10 is a cross-sectional view showing the structure of a third suspension of the scanning lens apparatus adopting a bimorph actuator of FIG. 9, according to another exemplary embodiment.

FIG. 10 is a cross-sectional view of the structure of the third suspension 330 of FIG. 9. The structure of the fourth suspension 340 is substantially the same as that of the third suspension 330.

Referring to FIGS. 9 and 10, the third bimorph 332 formed on the third suspension 330 may include a lower electrode 332a, a bimorph layer 332b, and an upper electrode 332c sequentially stacked in the stated order on the upper surface of the third suspension 330. The bimorph layer 332b is formed of a material that expands or contracts in a horizontal direction according to the polarity of a voltage applied between the upper electrode 332c and the lower electrode 332a. For example, the bimorph layer 332b may be a piezoelectric film. If an electric field applied to the piezoelectric film has the same direction as the polarization direction of the piezoelectric film, the piezoelectric film may expand, and if the electric field has a direction opposite to the polarization direction of the piezoelectric film, the piezoelectric film may contract. The lower electrode 332a and the upper electrode 332c may be flexible according to the deformation of the bimorph layer 332b. When the lower electrode 332a and the upper electrode 332c are formed of a metal, they may be formed to have a nano-thickness.

Also, the bimorph layer 332b may be formed of an electroactive polymer. The lower electrode 332a and the upper electrode 332c may also be ductile electrodes. Since the electroactive polymer performs only an expansion operation, the scanning lens apparatus 300 that employs the electroactive polymer performs scanning by moving downwards in a Y-axis direction when a predetermined voltage is applied to the third bimorph 332 and the fourth bimorph 334.

The fourth bimorph 334 also may include a lower electrode 334a, a bimorph layer 334b, and an upper electrode 334c sequentially stacked in the stated order on a lower surface of the third suspension 330. The fourth bimorph 334 may be practically the same as the third bimorph 332, and thus, detailed description thereof will not be repeated.

The Y-axis driving of the scanning lens apparatus 300 is the driving of the first lens 151 in the Y-axis direction by the driving of the first and second suspensions 110 and 120 while the second lens 152 is in a fixed state. This is substantially the same as the driving of the scanning lens apparatus 100, and thus, a detailed description thereof will not be repeated.

Figure 11:
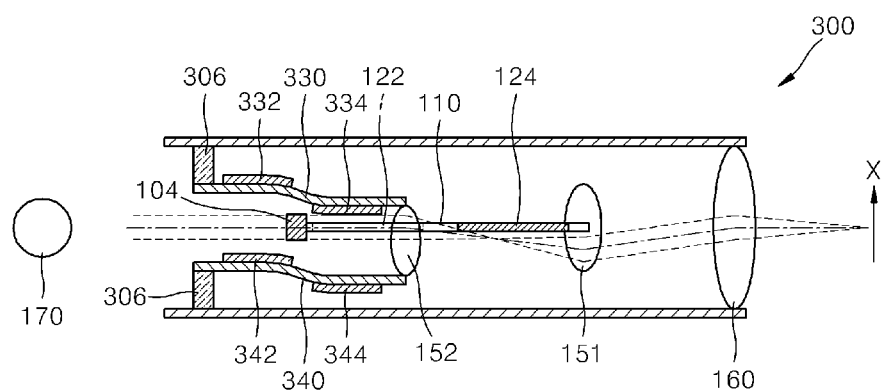
FIG. 11 is a schematic cross-sectional view for explaining an operation of a scanning lens apparatus adopting a bimorph actuator according to another exemplary embodiment.

FIG. 11 is a schematic cross-sectional view for explaining an operation of the scanning lens apparatus 300.

Referring to FIG. 11, when a predetermined voltage is applied to the third bimorphs 332 and 342 and the fourth bimorphs 334 and 344 to respectively expand the corresponding bimorph layers thereof, an end of the third bimorphs 332 and 342 primarily bends downwards and an end of the fourth bimorphs 334 and 344 bends upwards due to the expansion of the bimorph layers of the third bimorphs 332 and 342 and the fourth bimorphs 334 and 344. Accordingly, the third bimorphs 332 and 342 bend downwards in the X-axis direction, and the fourth bimorphs 334 and 344 bend upwards in the X-axis direction. Thus, light emitted from the light source 170 is compensated to proceed in a horizontal direction from the object lens 160. If there are no actions of the fourth bimorphs 334 and 344, a suspension bends with respect to the object lens 160, and as a result, light emitted from the object lens 160 may not be irradiated on an object perpendicularly to the object.

The magnitude of movement of the second lens 152 may be controlled by controlling the voltage applied to the bimorphs 332, 334, 342, and 344. When a voltage is not applied to the bimorphs 332, 334, 342, and 344, the second lens 152 returns to the original position due to the restoring force of the third and fourth suspensions 330 and 340. The operation described with reference to FIG. 11 may be applied to the cases that the bimorph layers of the bimorphs 332, 334, 342, and 344 are formed of a piezoelectric film or an electroactive polymer.

When the bimorph layers thereof are formed of a piezoelectric film, and a voltage applied to the bimorph in a direction to contract, light may be irradiated on the object in a direction opposite to the direction of FIG. 11.

Figure 12:
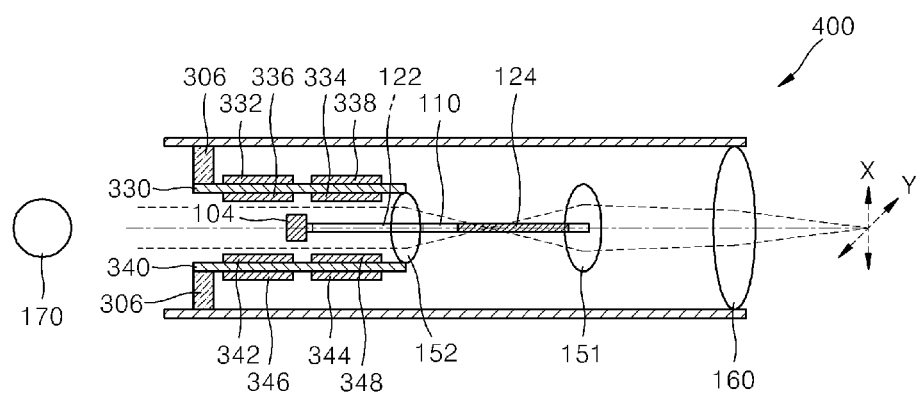
FIG. 12 is a schematic cross-sectional view of a scanning lens apparatus adopting a bimorph actuator, which is a modified version of the scanning lens apparatus adopting a bimorph actuator of FIG. 9, according to another exemplary embodiment.

FIG. 12 is a schematic cross-sectional view of a scanning lens apparatus 400 which is a modified version of the scanning lens apparatus 300 of FIGS. 7 through 9, according to another exemplary embodiment. Like reference numerals are used to indicate elements that are substantially identical to the elements of FIGS. 7 through 9, and thus, the detailed description thereof will not be repeated.

Referring to FIG. 12, with respect to the third suspension 330, bimorph 336 corresponding to the third bimorph 332 is disposed on a lower surface of the third suspension 330, and bimorph 338 corresponding to the fourth bimorph 334 is disposed on an upper surface of the third suspension 330. The structures of the bimorphs 336 and 338 are substantially the same as that of the third bimorph 332 (refer to FIG. 10), and thus, the detailed description thereof will not be repeated.

Also, bimorph 346 corresponding to the third bimorph 342 is disposed on a lower surface of the fourth suspension 340, and bimorph 348 corresponding to the fourth bimorph 344 is disposed on an upper surface of the fourth suspension 340. The structures of the bimorphs 346 and 348 are substantially the same as that of the fourth bimorph 334 (refer to FIG. 10), and thus, the detailed description thereof will not be repeated.

An operation of the scanning lens apparatus 400 will now be described with reference to FIG. 12.

First, a case when bimorph layers of the bimorphs 332, 342, 334, and 344 are formed of a piezoelectric film will be described.

A predetermined voltage is applied to the third bimorphs 332 and 342 and the fourth bimorphs 334 and 344 to respectively expand bimorph layers thereof, and another voltage is applied to the bimorphs 336, 338, 346, and 348 to contract the corresponding bimorph layers thereof. As a result, the driving force of the third and fourth suspensions 330 and 340 may be increased approximately twice to that of the scanning lens apparatus 300. The second lens 152 moves downwards in the X-axis direction.

A predetermined voltage is applied to the third bimorphs 332 and 342 and the fourth bimorphs 334 and 344 to respectively contract the bimorph layers thereof, and another voltage is applied to the bimorphs 336, 338, 346, and 348 to expand the bimorph layers thereof. As a result, the driving force of the third and fourth suspensions 330 and 340 may be increased approximately twice to that of the scanning lens apparatus 300. The second lens 152 moves upwards in the X-axis direction.

Also, the bimorph layers may be formed of an electroactive polymer. The lower electrodes and the upper electrodes of the bimorph may also be formed of a ductile polymer. Since the electroactive polymer performs only an expansion action, in order to move the scanning lens apparatus 400 adopting an electroactive polymer downwards in the X-axis direction, a voltage is applied only to the third bimorphs 332 and 342 and the fourth bimorphs 334 and 344 and no voltage is applied to the bimorphs 336, 338, 346, and 348. At this point, the driving of the scanning lens apparatus 400 is substantially the same as that of the scanning lens apparatus 300, and thus, the detailed description thereof will not be repeated.

In the case of the scanning lens apparatus 400 adopting an electroactive polymer, in order to move the scanning lens apparatus 400 upwards in the X-axis direction, a predetermined voltage is applied to the bimorphs 336, 338, 346, and 348, but no voltage is applied to the third bimorphs 332 and 342 and the fourth bimorphs 334 and 344.

When the first bimorphs 112 and 122, the second bimorphs 114 and 124, and the bimorphs 116, 118, 126, and 128 are respectively formed on upper or lower surfaces of the first suspension 110 and the second suspension 120, like the structure of FIG. 6, the driving force of the first suspension 110 and the second suspension 120 may also be increased. The structures may be well understood from the structure of FIG. 6, and thus, the detailed description thereof will not be repeated.

A scanning lens apparatus according to an exemplary embodiment uses a bimorph that compensates for the bending of a suspension to one side, and thus, enables light to be moved with linearity with respect to an object. Therefore, a two dimensional linear scanning with respect to an object to be imaged can be performed. Also, since the scanning lens apparatus uses a bimorph actuator that can be formed to be small in size, the scanning lens apparatus can be readily used in medical imaging fields.

While the inventive concept has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. A scanning lens apparatus with a bimorph actuator, the scanning lens apparatus comprising:
   a housing having a hollow cylindrical shape;
   a first suspension and a second suspension which are parallel to each other and a first end of the first suspension and a first end of the second suspension are fixed on an inner surface of the housing;
   first bimorphs disposed on first surfaces of the first suspension and first bimorphs disposed on first surfaces of the second suspension, and second bimorphs disposed on second surfaces facing the first surfaces with respect to the corresponding first suspension and the corresponding second suspension;
   a first lens which is fixed between a second end of the first suspension and a second end of the second suspension;
   a second lens which is fixed parallel to the first lens between the first suspension and the second suspension; and
   an object lens which is disposed on an end of the housing to face the second lens with respect to the first lens.

2. The scanning lens apparatus of claim 1, wherein the first bimorphs and the second bimorphs are separated from each other in a length direction of the corresponding suspension.

3. The scanning lens apparatus of claim 2, wherein the first bimorphs and the second bimorphs on the first suspension are disposed substantially identical to the first bimorphs and the second bimorphs on the second suspension.

4. The scanning lens apparatus of claim 2, wherein each of the first bimorphs and the second bimorphs have a structure in which a lower electrode, a bimorph layer, and an upper electrode are sequentially stacked in the stated order on the corresponding surface of the first suspension and the second suspension.

5. The scanning lens apparatus of claim 4, wherein the bimorph layer is formed of a piezoelectric film that expands or contracts according to a polarity of a voltage applied thereto, or formed of an electroactive polymer that expands in a length direction of the corresponding suspension by a voltage applied thereto.

6. The scanning lens apparatus of claim 2, wherein the first suspension further comprises bimorphs corresponding to the first bimorphs and the second bimorphs on the first suspension, and the second suspension further comprises bimorphs corresponding to the first bimorphs and the second bimorphs on the second suspension, and the bimorphs corresponding to the first bimorphs and the second bimorphs on the first suspension and the bimorphs corresponding to the first bimorphs and the second bimorphs on the second suspension respectively face the first bimorphs and the second bimorphs.

7. The scanning lens apparatus of claim 6, wherein each of the bimorphs corresponding to the first bimorphs and the second bimorphs have a structure in which a lower electrode, a bimorph layer, and an upper electrode are sequentially stacked in the stated order on the corresponding surface of the first suspension and the second suspension.

8. The scanning lens apparatus of claim 7, wherein the bimorphs corresponding to the first bimorphs and the second bimorphs are formed of a piezoelectric film that expands or contracts according to a polarity of a voltage applied thereto, or formed of an electroactive polymer that expands in a length direction of the corresponding suspension by a voltage applied thereto.

9. The scanning lens apparatus of claim 1, wherein the bimorph actuator moves the housing in a perpendicular direction with respect to an axis that is formed connecting the first suspension and the second suspension.

10. A scanning lens apparatus with a bimorph actuator, the scanning lens apparatus comprising:
a housing having a hollow cylindrical shape;
a first suspension and a second suspension which are parallel to each other, and a first end of the first suspension and a first end of the second suspension are fixed on an inner surface of the housing;
first bimorphs disposed on first surfaces of the first suspension and first bimorphs disposed on first surfaces of the second suspension, and second bimorphs disposed on second surfaces facing the first surfaces with respect to the corresponding first suspension and the corresponding second suspension;
a first lens which is fixed between a second end of the first suspension and a second end of the second suspension;
a third suspension and a fourth suspension, wherein a first end of the third suspension and a first end of the fourth suspension is fixed on the inner surface of the housing by forming a second axis with respect to a first axis that is formed by connecting the first suspension and the second suspension;
third bimorphs disposed on first surfaces of the third suspension and third bimorphs disposed on first surfaces of the fourth suspension, and fourth bimorphs disposed on second surfaces facing the first surfaces with respect to the corresponding third suspension and the corresponding fourth suspension;
a second lens which is fixed by a second end of the third suspension and a second end of the fourth suspension and the second lens is parallel to the first lens; and
an object lens disposed on an end of the housing to face the second lens with respect to the first lens.

11. The scanning lens apparatus of claim 10, wherein the first bimorphs and the second bimorphs are separated from each other in a length direction of the corresponding suspension.

12. The scanning lens apparatus of claim 11, wherein the first bimorphs and second bimorphs on the first suspension are disposed substantially identical to the first bimorphs and the second bimorphs on the second suspension.

13. The scanning lens apparatus of claim 11, wherein each of the first bimorphs and the second bimorphs have a structure in which a lower electrode, a bimorph layer, and an upper electrode are sequentially stacked in the stated order on the corresponding surface of the first suspension and the second suspension.

14. The scanning lens apparatus of claim 13, wherein the bimorph layer is formed of a piezoelectric film that expands or contracts according to a polarity of a voltage applied thereto, or formed of an electroactive polymer that expands in a length direction of the corresponding suspension by a voltage applied thereto.

15. The scanning lens apparatus of claim 11, wherein the first suspension further comprises bimorphs corresponding to the first bimorphs and the second bimorphs on the first suspension, the second suspension further comprises bimorphs corresponding to the first bimorphs and the second bimorphs on the second suspension, and the bimorphs corresponding to the first bimorphs and the second bimorphs respectively face the first bimorphs and the second bimorphs.

16. The scanning lens apparatus of claim 15, wherein each of the first bimorphs, the second bimorphs and the bimorphs corresponding to the first bimorphs and the second bimorphs have a structure in which a lower electrode, a bimorph layer, and an upper electrode are sequentially stacked in the stated order on the corresponding surface of the first suspension and the second suspension.

17. The scanning lens apparatus of claim 16, wherein the bimorph layer is formed of a piezoelectric film that expands or contracts according to a polarity of a voltage applied thereto, or formed of an electroactive polymer that expands in a length direction of the corresponding suspension by a voltage applied thereto.

18. The scanning lens apparatus of claim 10, wherein the third bimorphs and the fourth bimorphs are separated from each other in a length direction of the corresponding suspension.

19. The scanning lens apparatus of claim 18, wherein the third bimorphs and the fourth bimorphs of the third suspension are disposed substantially identical to the third bimorphs and the fourth bimorphs of the fourth suspension.

20. The scanning lens apparatus of claim 18, wherein the third bimorphs and the fourth bimorphs each has a structure in which a lower electrode, a bimorph layer, and an upper electrode are sequentially stacked in the stated order on the corresponding surface of the third suspension and the fourth suspension.

21. The scanning lens apparatus of claim 20, wherein the bimorph layer is formed of a piezoelectric film that expands or contracts according to a polarity of a voltage to be applied thereto, or formed of an electroactive polymer that expands in a length direction of the corresponding suspension by a voltage applied thereto.

22. The scanning lens apparatus of claim 18, wherein the third suspension further comprises bimorphs corresponding to the third bimorphs and the fourth bimorphs, and the fourth suspension further comprises bimorphs corresponding to the third bimorphs and the fourth bimorphs, and the bimorphs corresponding to the third bimorphs and the fourth bimorphs face the third bimorphs and the fourth bimorphs.

23. The scanning lens apparatus of claim 22, wherein each of the bimorphs corresponding to the third bimorphs and the fourth bimorphs has a structure in which a lower electrode, a bimorph layer, and an upper electrode are sequentially stacked in the stated order on the corresponding surface of the third suspension and the fourth suspension.

24. The scanning lens apparatus of claim 23, wherein the bimorph layer is formed of a piezoelectric film that expands or contracts according to a polarity of a voltage to be applied thereto, or formed of an electroactive polymer that expands in a length direction of the corresponding suspension by a voltage applied thereto.

* * * * *